(12) United States Patent
Short

(10) Patent No.: US 12,295,383 B2
(45) Date of Patent: May 13, 2025

(54) CONFECTIONARY COMPOSITIONS

(71) Applicant: Macapan Hawaii LLC, Hilo, HI (US)

(72) Inventor: Maria Short, Hilo, HI (US)

(73) Assignee: Macapan Hawaii LLC, Hilo, HI (US)

( * ) Notice: Subject to any disclaimer, the term of this patent is extended or adjusted under 35 U.S.C. 154(b) by 614 days.

(21) Appl. No.: 17/533,581

(22) Filed: Nov. 23, 2021

(65) Prior Publication Data

US 2022/0110337 A1 Apr. 14, 2022

Related U.S. Application Data

(63) Continuation of application No. PCT/US2020/034868, filed on May 28, 2020.

(60) Provisional application No. 62/855,571, filed on May 31, 2019.

(51) Int. Cl.
| | |
|---|---|
| A23G 3/48 | (2006.01) |
| A21D 2/16 | (2006.01) |
| A21D 2/18 | (2006.01) |
| A21D 2/36 | (2006.01) |
| A21D 13/04 | (2017.01) |
| A23G 3/40 | (2006.01) |
| A23G 3/42 | (2006.01) |

(52) U.S. Cl.
CPC .............. *A23G 3/48* (2013.01); *A21D 2/165* (2013.01); *A21D 2/181* (2013.01); *A21D 2/364* (2013.01); *A21D 13/04* (2013.01); *A23G 3/40* (2013.01); *A23G 3/42* (2013.01); *A23V 2002/00* (2013.01)

(58) Field of Classification Search
CPC ........... A23G 3/48; A21D 13/04; A21D 2/364
See application file for complete search history.

(56) References Cited

U.S. PATENT DOCUMENTS

| 4,828,868 A | 5/1989 | Lasdon et al. |
| 2002/0098267 A1* | 7/2002 | Conrad Heisey .... A21D 13/064 426/549 |
| 2002/0106441 A1 | 8/2002 | Wong et al. |
| 2015/0352163 A1 | 12/2015 | Anderson et al. |
| 2019/0082725 A1 | 3/2019 | Strecker et al. |

FOREIGN PATENT DOCUMENTS

WO  WO-2020/243263 A1  12/2020

OTHER PUBLICATIONS

International Search Report and Written Opinion for International Application No. PCT/US2020/034868 mailed Jul. 30, 2020.

\* cited by examiner

*Primary Examiner* — Jenna A Watts
(74) *Attorney, Agent, or Firm* — Foley Hoag LLP; Erik A. Huestis; Lawrence P. Tardibono

(57) ABSTRACT

Macadamia nut-based compositions suitable for use in confectionary and baking are provided.

16 Claims, 2 Drawing Sheets

To Fig. 1B

CONFECTIONARY COMPOSITIONS

CROSS-REFERENCE TO RELATED APPLICATIONS

This application is a continuation of PCT International Application No. PCT/US20/34868, filed May 28, 2020, which claims the benefit of U.S. Provisional Application No. 62/855,571, filed May 31, 2019, each of which are hereby incorporated by reference in their entirety.

BRIEF SUMMARY

According to embodiments of the present disclosure, confectionary compositions are provided.

DETAILED DESCRIPTION

Figure 1A:
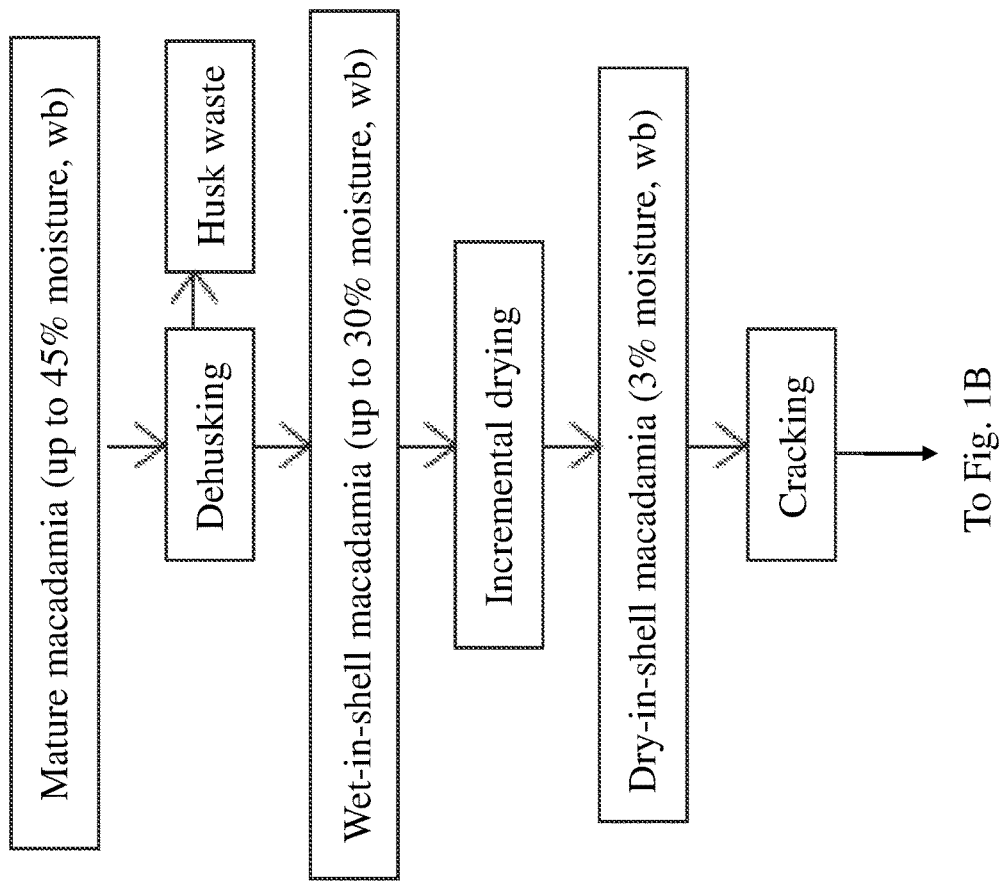
FIGS. 1A-B illustrate an exemplary process of macadamia nut processing.

Marzipan (or marchpane) is an almond-based confection. In various formulations, it may include sugar or honey and almond meal. Various formulations may be augmented with almond oil or extract. Marzipan may be dyed to be used in icings.

Marzipan is used to produce various sugar confections, such as chocolate-covered marzipan and marzipan figurines (e.g., of fruits, animals, or decorative elements). Marzipan is also useful in biscuits or for icing cakes. Marzipan paste is useful as a baking ingredient, for example in fruit breads and pastries such as stollen and banket.

In an exemplary process for the preparation of marzipan, raw almonds are cleaned by sieving, air elutriation, and other electronic or mechanical devices. The almonds are then blanched, for example by immersion in water with a temperature just below the boiling point for about five minutes. This loosens the almonds' skin, which may then be removed by passing the almonds through rubber-covered rotating cylinders. This process reduces hydrogen cyanide (HCN) concentration and increases water content. They are then cooled, after which they are coarsely chopped and ground.

In an exemplary process, marzipan is made by grinding whole almonds with sugar and partially drying the paste. In another exemplary process, marzipan is made by combining ground almonds with sugar syrup. The ground mixture may be mixed with sugar (e.g., up to 35%), and then roasted. Once cooled, sucrose (table sugar) and optionally a binding agent such as starch syrup or sorbitol are added. The resulting marzipan may then be molded.

The resulting marzipan includes several phases: a solid phase of suspended particles including almonds and sugars, a suspended air pocket phase formed from incorporated air during mixing, a water phase, and a lipid phase from almond oil. The phases can separate when left alone for long periods of time. The marzipan is stabilized by the phospholipids and triglycerides found in the almond cells. The fatty acids found in almonds include saturated fats such as stearic acid and unsaturated fats such as linoleic acid. Emulsifiers can be added during production to increase shelf life.

To preserve a workable softness, marzipan generally has a moisture content of less than 10%.

Various flavorings and extracts may be added to marzipan, such as rosewater. Sugar free marzipan can be made by replacing sugar with polyols such as maltitol.

Marzipan must be covered in an airtight container to prevent it from hardening and dehydrating. It should be protected from direct light to prevent rancidity of the almond oil, a result of lipid oxidation.

Almonds generally comprise about 4% water, 22% carbohydrates, 21% protein, and 50% fat. A 100 gram reference amount of almonds supplies 579 calories. Standard nutritional information for almonds is summarized in Table 1 (Vitamins), Table 2 (Minerals), Table 3 (Proteins and Aminoacids), Table 4 (Carbohydrates), Table 5 (Fats and Fatty Acids), Table 6 (Sterols), and Table 7 (Other Components).

TABLE 1

| Nutrient | Amount | DV |
|---|---|---|
| Betaine | 0.5 mg | |
| Choline | 52.1 mg | |
| Folate | 44.00 mcg | |
| Folic acid | 0.00 mcg | |
| Niacin | 3.618 mg | 23% |
| Pantothenic acid | 0.471 mg | 5% |
| Riboflavin | 1.138 mg | 67% |
| Thiamin | 0.205 mg | 14% |
| Vitamin A | 2.00 IU | 0% |
| Vitamin A, RAE | 0.00 mcg | |
| Carotene, alpha | 0.00 mcg | |
| Carotene, beta | 1.00 mcg | |
| Cryptoxanthin, beta | 0.00 mcg | |
| Lutein + zeaxanthin | 1.00 mcg | |
| Lycopene | 0.00 mcg | |
| Vitamin B12 | 0.00 mcg | 0% |
| Vitamin B6 | 0.137 mg | 7% |
| Vitamin C | 0.0 mg | 0% |
| Vitamin D | 0.00 IU | 0% |
| Vitamin E | 25.63 mg | 85% |
| Tocopherol, alpha | 25.63 mg | |
| Tocopherol, beta | 0.23 mg | |
| Tocopherol, delta | 0.07 mg | |
| Tocopherol, gamma | 0.64 mg | |
| Vitamin K | 0.0 mcg | 0% |

TABLE 2

| Nutrient | Amount | DV |
|---|---|---|
| Calcium, Ca | 269.00 mg | 27% |
| Copper, Cu | 1.031 mg | 52% |
| Iron, Fe | 3.71 mg | 21% |
| Magnesium, Mg | 270.00 mg | 68% |
| Manganese, Mn | 2.179 mg | 109% |
| Phosphorus, P | 481.00 mg | 48% |
| Potassium, K | 733.00 mg | 16% |
| Selenium, Se | 4.1 mcg | 6% |
| Sodium, Na | 1.00 mg | 0% |
| Zinc, Zn | 3.12 mg | 21% |

TABLE 3

| Nutrient | Amount | DV |
|---|---|---|
| Protein | 21.15 g | 42% |
| Alanine | 0.999 g | |
| Arginine | 2.465 g | |
| Aspartic acid | 2.639 g | |
| Cystine | 0.215 g | |
| Glutamic acid | 6.206 g | |
| Glycine | 1.429 g | |
| Histidine | 0.539 g | |
| Isoleucine | 0.751 g | 54% |
| Leucine | 1.473 g | 54% |

TABLE 3-continued

| Nutrient | Amount | DV |
| --- | --- | --- |
| Lysine | 0.568 g | 27% |
| Methionine | 0.157 g | 15% |
| Phenylalanine | 1.132 g | 65% |
| Proline | 0.969 g | |
| Serine | 0.912 g | |
| Threonine | 0.601 g | 57% |
| Tryptophan | 0.211 g | 75% |
| Tyrosine | 0.450 g | 26% |
| Valine | 0.855 g | 47% |

TABLE 4

| Nutrient | Amount | DV |
| --- | --- | --- |
| Carbohydrate | 21.55 g | 7% |
| Fiber | 12.5 g | 50% |
| Sugars | 4.35 g | |
| Fructose | 0.11 g | |
| Galactose | 0.07 g | |
| Glucose (dextrose) | 0.17 g | |
| Lactose | 0.00 g | |
| Maltose | 0.04 g | |
| Starch | 0.72 g | |
| Sucrose | 3.95 g | |

TABLE 5

| Nutrient | Amount | DV |
| --- | --- | --- |
| Fat | 49.93 g | 77% |
| Saturated fatty acids | 3.802 g | 19% |
| Butanoic acid | 0.000 g | |
| Decanoic acid | 0.000 g | |
| Docosanoic acid | 0.001 g | |
| Dodecanoic acid | 0.000 g | |
| Eicosanoic acid | 0.007 g | |
| Heptadecanoic acid | 0.004 g | |
| Hexadecanoic acid | 3.083 g | |
| Hexanoic acid | 0.000 g | |
| Octadecanoic acid | 0.704 g | |
| Octanoic acid | 0.000 g | |
| Pentadecanoic acid | 0.000 g | |
| Tetracosanoic acid | 0.000 g | |
| Tetradecanoic acid | 0.003 g | |
| Tridecanoic acid | 0.000 g | |
| Monounsaturated fatty acids | 31.551 g | |
| Cis-hexadecenoic acid | 0.227 g | |
| Cis-octadecenoic acid | 31.294 g | |
| Docosenoic acid | 0.000 g | |
| Eicosenoic acid | 0.005 g | |
| Heptadecenoic acid | 0.013 g | |
| Hexadecenoic acid | 0.239 g | |
| Octadecenoic acid | 31.294 g | |
| Pentadecenoic acid | 0.000 g | |
| Tetracosenoic cis acid | 0.000 g | |
| Tetradecenoic acid | 0.000 g | |
| Trans-hexadecenoic acid | 0.012 g | |
| Trans-octadecenoic acid | 0.000 g | |
| Polyunsaturated fatty acids | 12.329 g | |
| Cis,cis,cis-octadecatrienoic n-3 acid | 0.003 g | |
| Cis,cis,cis-octadecatrienoic n-6 acid | 0.000 g | |
| Cis,cis-eicosadienoic n-6 acid | 0.002 g | |
| Cis,cis-octadecadienoic n-6 acid | 12.320 g | |
| Docosahexaenoic n-3 acid | 0.000 g | |
| Docosapentaenoic n-3 acid | 0.000 g | |
| Eicosadienoic acid | 0.000 g | |
| Eicosapentaenoic n-3 acid | 0.000 g | |
| Eicosatetraenoic acid | 0.000 g | |
| Octadecadienoic CLAs acid | 0.002 g | |
| Octadecadienoic acid | 12.324 g | |
| Octadecatetraenoic acid | 0.000 g | |
| Octadecatrienoic acid | 0.003 g | |
| Trans-octadecadienoic acid | 0.003 g | |

TABLE 5-continued

| Nutrient | Amount | DV |
| --- | --- | --- |
| Fatty acids, total trans | 0.015 g | |
| Fatty acids, total trans-monoenoic | 0.012 g | |
| Fatty acids, total trans-polyenoic | 0.003 g | |

TABLE 6

| Nutrient | Amount | DV |
| --- | --- | --- |
| Beta-sitosterol | 130.00 mg | |
| Campesterol | 5.00 mg | |
| Cholesterol | 0.00 mg | 0% |
| Stigmasterol | 4.00 mg | |

TABLE 7

| Nutrient | Amount | DV |
| --- | --- | --- |
| Alcohol, ethyl | 0.0 g | |
| Ash | 2.97 g | |
| Caffeine | 0.00 mg | |
| Dihydrophylloquinone | 0.0 mcg | |
| Theobromine | 0.00 mg | |
| Water | 4.41 g | |

Almonds have significant drawbacks for confectionary applications, both in terms of production and consumption.

Tree nuts such as almonds are one of the leading food causes of allergic reactions. These allergic reactions can range from a mild rash to severe breathing difficulties. Cross-reactivity is common with peach allergens (lipid transfer proteins) and tree nut allergens. Symptoms range from local signs and symptoms (e.g., oral allergy syndrome, contact urticaria) to systemic signs and symptoms including anaphylaxis (e.g., urticaria, angioedema, gastrointestinal and respiratory symptoms).

Almonds are susceptible to aflatoxin-producing molds. Aflatoxins are potent carcinogenic chemicals produced by molds such as *Aspergillus flavus* and *Aspergillus parasiticus*. Mold contamination may occur from soil, previously infested almonds, and almond pests such as navel-orange worm. It is unsafe to eat mold infected tree nuts.

Almond production involves damaging and unsustainable agricultural practices. It takes approximately 15 gallons of water to produce just 16 almonds, making almonds one of the most water-intensive nut crops. In almond producing regions such as California, this requires significant diversion of ground and surface waters. In California, groundwater depletion has led to sinking of the ground in areas such as the San Joaquin Valley.

Almond production also involves significant pesticide use, which contaminates limited water resources. Moreover, various pesticide residues are toxic to honey bees, posing yet another threat to the environment.

To address the shortcomings of existing confectionary compositions such as almond-based marzipan, the present disclosure provides for various confectionary compositions and methods of making confectionary compositions that use macadamia nuts.

In various embodiments, a macadamia nut paste is provided that may be substituted for marzipan or other nut pastes. Macadamia nut pastes according to the present disclosure provide an alternative those individuals that are allergic to almonds and therefore almond paste and marzipan. Moreover, macadamia nut pastes according to the present disclosure leverage milled macadamia nut chips or cake, which are a byproduct of macadamia nut oil manufacturing. Accordingly, macadamia nut pastes according to the present disclosure provide a more sustainable alternative to almond paste and marzipan.

In an exemplary composition, a macadamia nut confectionary composition comprises defatted milled macadamia nut flour, cane sugar, honey, water, macadamia nut butter, vanilla, salt, and potassium sorbate (a preservative).

Macadamia is a genus of four species of trees indigenous to Australia, and constituting part of the plant family Proteaceae. They are native to northeastern New South Wales and central and south eastern Queensland. Three species of the genus are commercially important for their fruit, the macadamia nut, with a total global production of 160,000 tonnes (180,000 short tons) in 2015.

Three of the four *Macadamia* species—*Macadamia integrifolia*, *Macadamia ternifolia*, and *Macadamia tetraphylla*—are of commercial importance. The other species, *M. jansenii*, is not edible.

The macadamia tree does not begin to produce commercial quantities of seeds until it is 7-10 years old, but once established, may continue bearing for over 100 years. Their nuts mature throughout the year (not seasonally), so the process of gathering and hulling the nuts is continuous. Macadamias prefer fertile, well-drained soils, a rainfall of 40-80 in (1,000-2,000 mm) per year, and temperatures not falling below 50° F. (10° C.). Once established, they can withstand light frosts Macadamia trees are high yield. For example, the widely planted Beaumont hybrid of *Macadamia integrifolia* and *M. tetraphylla* can yield 40 lb (18 kg) of fruit per tree per year. The Nelmac II hybrid can yield 50 lb (22 kg) per tree per year.

Macadamia nuts generally comprise about 76% fat, 14% carbohydrates, including 9% dietary fiber, and 8% protein. A 100-gram reference amount of macadamia nuts supplies 740 calories. Standard nutritional information for macadamia nuts is summarized in Table 8 (Vitamins), Table 9 (Minerals), Table 10 (Proteins and Aminoacids), Table 11 (Carbohydrates), Table 12 (Fats and Fatty Acids), Table 13 (Sterols), and Table 14 (Other Components).

TABLE 8

| Nutrient | Amount | DV |
|---|---|---|
| Folate | 11.00 mcg | |
| Folic acid | 0.00 mcg | |
| Niacin | 2.473 mg | 15% |
| Pantothenic acid | 0.758 mg | 8% |
| Riboflavin | 0.162 mg | 10% |
| Thiamin | 1.195 mg | 80% |
| Vitamin A | 0.00 IU | 0% |
| Vitamin A, RAE | 0.00 mcg | |
| Vitamin B12 | 0.00 mcg | 0% |
| Vitamin B6 | 0.275 mg | 14% |
| Vitamin C | 1.2 mg | 2% |
| Vitamin D | 0.00 IU | 0% |
| Vitamin E | 0.54 mg | 2% |
| Tocopherol, alpha | 0.54 mg | |
| Tocopherol, beta | 0.00 mg | |
| Tocopherol, delta | 0.00 mg | |
| Tocopherol, gamma | 0.00 mg | |

TABLE 9

| Nutrient | Amount | DV |
|---|---|---|
| Calcium, Ca | 85.00 mg | 8% |
| Copper, Cu | 0.756 mg | 38% |
| Iron, Fe | 3.69 mg | 20% |
| Magnesium, Mg | 130.00 mg | 32% |
| Manganese, Mn | 4.131 mg | 207% |
| Phosphorus, P | 188.00 mg | 19% |
| Potassium, K | 368.00 mg | 8% |
| Selenium, Se | 3.6 mcg | 5% |
| Sodium, Na | 5.00 mg | 0% |
| Zinc, Zn | 1.30 mg | 9% |

TABLE 10

| Nutrient | Amount | DV |
|---|---|---|
| Protein | 7.91 g | 16% |
| Alanine | 0.388 g | |
| Arginine | 1.402 g | |
| Aspartic acid | 1.099 g | |
| Cystine | 0.006 g | |
| Glutamic acid | 2.267 g | |
| Glycine | 0.454 g | |
| Histidine | 0.195 g | |
| Isoleucine | 0.314 g | 22% |
| Leucine | 0.602 g | 22% |
| Lysine | 0.018 g | 1% |
| Methionine | 0.023 g | 2% |
| Phenylalanine | 0.665 g | 38% |
| Proline | 0.468 g | |
| Serine | 0.419 g | |
| Threonine | 0.370 g | 35% |
| Tryptophan | 0.067 g | 24% |
| Tyrosine | 0.511 g | 29% |
| Valine | 0.363 g | 20% |

TABLE 11

| Nutrient | Amount | DV |
|---|---|---|
| Carbohydrate | 13.82 g | 5% |
| Fiber | 8.6 g | 34% |
| Sugars | 4.57 g | |
| Fructose | 0.07 g | |
| Glucose (dextrose) | 0.07 g | |
| Lactose | 0.00 g | |
| Maltose | 0.00 g | |
| Starch | 1.05 g | |
| Sucrose | 4.43 g | |

TABLE 12

| Nutrient | Amount | DV |
|---|---|---|
| Fat | 75.77 g | 117% |
| Saturated fatty acids | 12.061 g | 60% |
| Butanoic acid | 0.000 g | |
| Decanoic acid | 0.000 g | |
| Docosanoic acid | 0.616 g | |
| Dodecanoic acid | 0.076 g | |
| Eicosanoic acid | 1.940 g | |
| Heptadecanoic acid | 0.124 g | |
| Hexadecanoic acid | 6.036 g | |
| Hexanoic acid | 0.000 g | |
| Octadecanoic acid | 2.329 g | |
| Octanoic acid | 0.000 g | |
| Pentadecanoic acid | 0.000 g | |
| Tetracosanoic acid | 0.281 g | |
| Tetradecanoic acid | 0.659 g | |
| Tridecanoic acid | 0.000 g | |
| Monounsaturated fatty acids | 58.877 g | |
| Docosenoic acid | 0.233 g | |
| Eicosenoic acid | 1.890 g | |
| Hexadecenoic acid | 12.981 g | |

TABLE 12-continued

| Nutrient | Amount | DV |
|---|---|---|
| Octadecenoic acid | 43.755 g | |
| Tetracosenoic cis acid | 0.018 g | |
| Tetradecenoic acid | 0.000 g | |
| Polyunsaturated fatty acids | 1.502 g | |
| Cis,cis-eicosadienoic n-6 acid | 0.000 g | |
| Docosahexaenoic n-3 acid | 0.000 g | |
| Docosapentaenoic n-3 acid | 0.000 g | |
| Eicosadienoic acid | 0.000 g | |
| Eicosapentaenoic n-3 acid | 0.000 g | |
| Eicosatetraenoic acid | 0.000 g | |
| Octadecadienoic acid | 1.296 g | |
| Octadecatetraenoic acid | 0.000 g | |
| Octadecatrienoic acid | 0.206 g | |

TABLE 13

| Nutrient | Amount | DV |
|---|---|---|
| Beta-sitosterol | 108.00 mg | |
| Campesterol | 8.00 mg | |
| Cholesterol | 0.00 mg | 0% |
| Phytosterols | 116.00 mg | |
| Stigmasterol | 0.00 mg | |

TABLE 14

| Nutrient | Amount | DV |
|---|---|---|
| Alcohol, ethyl | 0.0 g | |
| Ash | 1.14 g | |
| Caffeine | 0.00 mg | |
| Theobromine | 0.00 mg | |
| Water | 1.36 g | |

The mineral composition of macadamia nuts is particularly healthy among nuts. In particular, diets with a high intake of calcium, magnesium and potassium, combined with a low sodium intake, help prevent cardiovascular diseases, hypertension, bone demineralization, and insulin resistance.

Macadamia oil (or macadamia nut oil) is the non-volatile oil collected from macadamia nut meat. The macadamia nut has high lipid content, as noted above. This allows macadamia oil to be extracted by cold pressing. Cold pressing yields extra virgin macadamia oil and partially defatted meal. The meal can be subjected to a second pressing and/or solvent extraction to obtain additional oil for a second refining process.

Figure 1B:
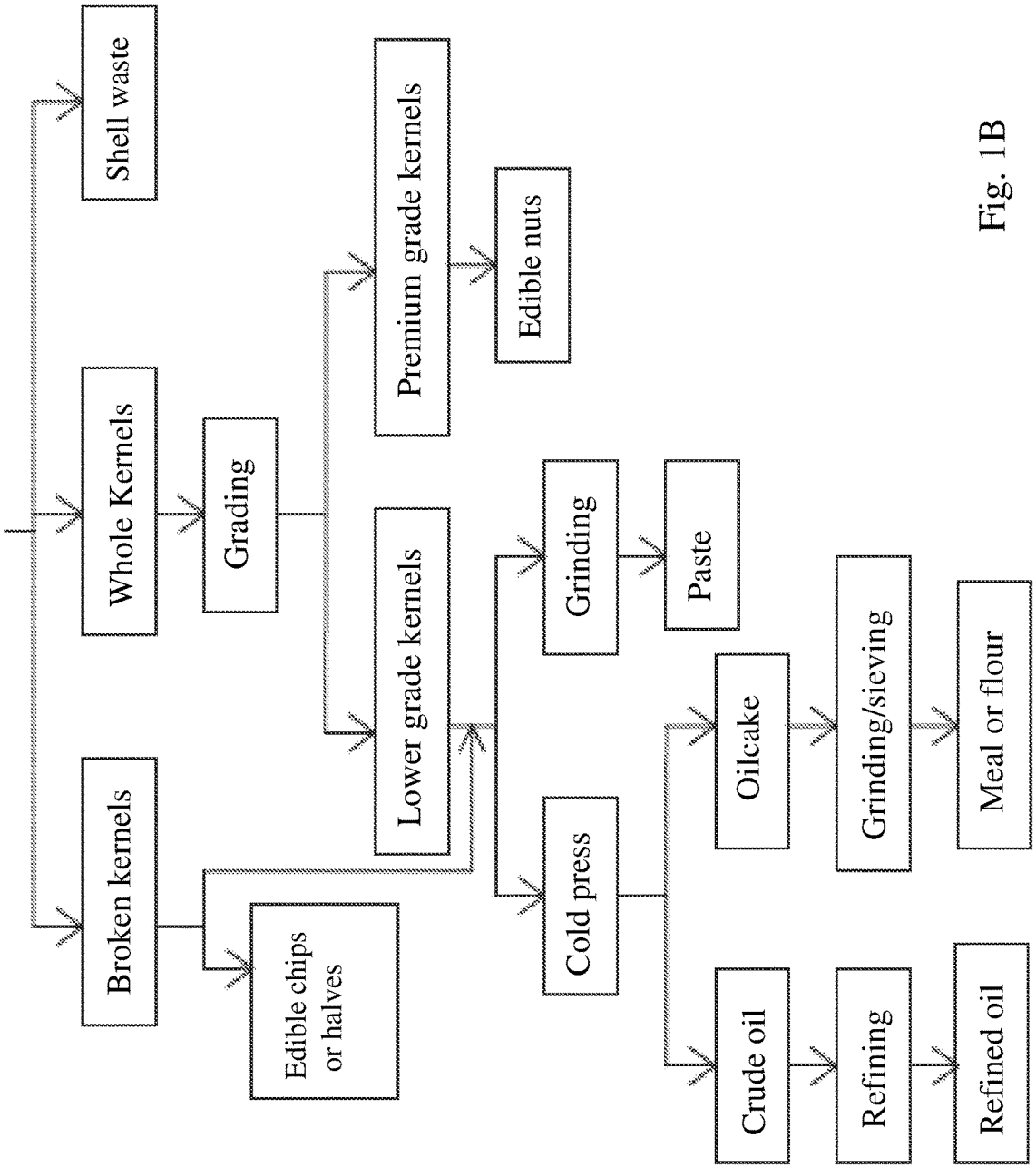

Referring to FIGS. 1A-B, the overall production pipeline for macadamia oil and for macadamia meal or flour is illustrated.

To extract oil, the kernels must be removed from the husk, which may be done using dehuskers made of double rollers that strip the husk away. The husked nut has a moisture content of about 25%, which is reduced to about 1.5% to 3.5% by drying. Drying may be done, e.g., in a greenhouse, by curing at temperatures of 104-122° F. (40-50° C.), by natural convection in the shade, or by forced convection dryers, or some combination of multiple methods.

Macadamia oil extraction may be performed by cold pressing. In cold pressing, pressure is applied to the nuts while the temperature remains low to avoid loss of flavor, for example using hydraulic presses.

The yield of extraction by cold pressing is approximately 35-40%. Accordingly, the solid material left over contains a significant quantity of oil. Partially defatted meal contains from about 23% to as high as 52% oil contents. The partially defatted meal may be subjected to a second oil extraction process or be used in preparing confectionary compositions as set out herein.

To extract oil from partially defatted meal, solvent extraction, for example using hexane, ethanol, or isopropanol. Using solvent extraction, yields higher than 50% may be obtained. Oil may also be extracted using subcritical fluid extraction, for example using n-butane, propane, dimethyl ether, or tetrafluoroethane, achieving yields of 94%-98%.

Both partially defatted meal (e.g., 12-15% lipid content) and fully defatted meal (e.g., 1% lipid content) may be used to make flour. Even defatted meals are rich in protein (e.g., 30-37% in dry basis) and carbohydrates (e.g., 49-57% in dry basis). Partially defatted macadamia flour has a water holding capacity of approximately 1.58 g of water per g of flour and an oil holding capacity of approximately 3.40 g of oil per g of flour. This provides advantageous texture, moisture retention, and appearance for confectionary compositions set out herein. For comparison, whole macadamia flour (which is milled without defatting) has a water holding capacity of approximately 0.66 g of water per g of flour and an oil holding capacity of approximately 1.12 g of oil per g flour. The holding capacity of partially defatted macadamia flour compares favorably to other nut flours.

As described further above, defatted and low-fat macadamia flours are nutritious by-products of macadamia oil production. Whereas macadamia kernels are high in monounsaturated fatty acids, macadamia flours are rich in proteins and dietary fibers. A greater extent of lipid removal leads to enhanced water and oil absorption capacities as well as foaming capacity of macadamia flours.

In a first exemplary embodiment of a confectionary composition according to the present disclosure, defatted macadamia nut meal is sieved to 1/32" (or approximately 1 mm), yielding a fine flour. The resulting flour is mixed with cane sugar, honey, water, vanilla, salt and a potassium sorbate solution. It is allowed to rest for 30 minutes and then macadamia nut butter is briefly mixed in until a homogenous and pliable dough is formed. This dough may be worked into various forms like marzipan, any may be used in in biscuits or for icing cakes.

In various embodiments, the macadamia nut meal is produced by passing a oilcake or chips through a hammer mill.

It will be appreciated that a variety of ratios between ingredients will provide a useful confectionary composition. However, various exemplary ratios are provided below. Ratios in a first exemplary composition are given in Table 15.

TABLE 15

| Ingredient | Amount | Percent by Weight |
|---|---|---|
| Macadamia nut flour (defatted) | 250 g | 27.4% |
| cane sugar | 250 g | 27.4% |
| honey | 75 g | 8.2% |
| water | 200 g | 21.9% |
| vanilla extract | ½ tsp (~2.5 g) | 0.3% |
| salt | ¼ tsp (~1.4 g) | 0.2% |
| potassium sorbate solution | 1.5 tsp (~7.4 g) | 0.8% |
| macadamia nut butter | 125 g | 13.7% |
| Total | 911.3 g | 100% |

It will be appreciated that vanilla, salt, and potassium sorbate may be omitted, yielding the ratios in Table 16.

TABLE 16

| Ingredient | Amount | Percent by Weight |
|---|---|---|
| Macadamia nut flour (defatted) | 250 g | 27.8% |
| cane sugar | 250 g | 27.8% |
| honey | 75 g | 8.3% |
| water | 200 g | 22.2% |
| macadamia nut butter | 125 g | 13.9% |
| Total | 900 g | 100% |

Similarly, the amount of water may be varied according to the desired consistency of the resulting dough, yielding the ratios in Table 17.

TABLE 17

| Ingredient | Amount | Percent by Weight |
|---|---|---|
| Macadamia nut flour (defatted) | 250 g | 25-29.4% |
| cane sugar | 250 g | 25-29.4% |
| honey | 75 g | 7.5-8.8% |
| water | 150-300 g | 17.6-30% |
| macadamia nut butter | 125 g | 12.5-14.7% |
| Total | 850-1000 g | 100% |

In various embodiments, other nut flours may be substituted for some or all of the macadamia nut flour. For example, in some embodiments, coconut flour is substituted.

In various embodiments, alternative sweeteners are substituted for some or all of the cane sugar. For example, in some embodiments, beet sugar or sorbitol is substituted.

In various embodiments, alternative sweeteners are substituted for some or all of the honey. For example, in some embodiments, agave nectar, glucose, corn syrup, or molasses are substituted. In addition, it will be appreciated that the cane sugar and honey may be substituted for each other so as to maintain about the same level of overall sweetness.

In various embodiments, tea, coffee, or juice may be substituted for some or all of the water.

In various embodiments, alternative flavoring agents may be substituted for some or all of the vanilla extract. For example, almond, orange, or rosewater may be substituted.

In various embodiments, alternative fats may be substituted for the macadamia nut butter. For example, in some embodiments, butter, coconut oil, vegetable oil, or olive oil may be substituted.

Referring to the above ratios, various exemplary embodiments contain a ratio of 2:1 defatted macadamia nut flour to macadamia nut butter. For the reference amounts above, 250 g of defatted flour accounts for approximately 2.5 g of lipids (1%) and 125 g of nut butter accounts for approximately 94.7 g of lipids (75.77%). Accordingly, the exemplary composition of Table 17 contains 9.7-11.4% macadamia nut fat by weight. Similarly, the defatted flour accounts for 75-92.5 g of protein (30-37%) and 122.5-142.5 g of carbohydrates (49-57%). The nut butter accounts for approximately 9 g of protein (7.9%) and 17.3 g of carbohydrates (13.8%). Accordingly, the exemplary composition of Table 17 contains at least 8.4% macadamia nut protein by weight.

It will be appreciated that while defatted macadamia nut flour is used in various embodiments, partially defatted flour may be used to create a suitable confectionary composition in alternative embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Numeric ranges are inclusive of the numbers defining the range. Measured and measureable values are understood to be approximate, taking into account significant digits and the error associated with the measurement. As used in this application, the terms "about" and "approximately" have their art-understood meanings; use of one vs the other does not necessarily imply different scope. Unless otherwise indicated, numerals used in this application, with or without a modifying term such as "about" or "approximately", should be understood to encompass normal divergence and/or fluctuations as would be appreciated by one of ordinary skill in the relevant art. As used in the claims, the term "about" indicates a variation of +/−5% unless otherwise specified or otherwise evident from the context.

What is claimed is:

1. A confectionary composition, consisting essentially of:
   25-30% by weight defatted macadamia nut flour;
   12.5-15% by weight macadamia nut butter;
   25-30% by weight of a sweetener; and
   water.

2. The confectionary composition of claim 1, comprising at least 8% macadamia nut protein by weight.

3. The confectionary composition of claim 1, comprising at least 9% macadamia nut fat by weight.

4. The confectionary composition of claim 1, comprising 25-30% cane sugar by weight.

5. The confectionary composition of claim 1, further comprising 7-9% honey by weight.

6. The confectionary composition of claim 1, comprising 17-30% water by weight.

7. The confectionary composition of claim 1, wherein the sweetener comprises cane sugar, honey, beet sugar, sorbitol, agave nectar, glucose, corn syrup, or molasses.

8. The confectionary composition of claim 1, further comprising one or more flavoring selected from the group consisting of vanilla, almond, orange, or rosewater.

9. A method of preparing a confectionary composition of claim 1, comprising:
   sieving defatted macadamia nut meal to 1 mm or less to yield a flour;
   mixing the sieved defatted macadamia nut flour with a sweetener and water to yield an intermediate composition; and
   mixing the intermediate composition with macadamia nut butter to yield the confectionary composition.

10. The method of claim 9, wherein the confectionary composition comprises at least 8% macadamia nut protein by weight.

11. The method of claim 9, wherein the confectionary composition comprises at least 9% macadamia nut fat by weight.

12. The method of claim 9, wherein the confectionary composition comprises 25-30% cane sugar by weight.

13. The method of claim 9, wherein the confectionary composition comprises 7-9% honey by weight; and/or 17-30% water by weight.

14. The method of claim 9, wherein the sweetener comprises cane sugar, honey, beet sugar, sorbitol, agave nectar, glucose, corn syrup, or molasses.

15. The method of claim 9, further comprising: adding to the intermediate composition one or more flavoring selected from the group consisting of vanilla, almond, orange, or rosewater.

16. The confectionary composition of claim 1, wherein the weight ratio of defatted macadamia nut flour to macadamia nut butter is about 2:1.

\* \* \* \* \*